(12) United States Patent
Lin et al.

(10) Patent No.: US 11,789,548 B2
(45) Date of Patent: Oct. 17, 2023

(54) INPUT MOUSE TEMPERATURE CONTROL SYSTEM

(71) Applicant: Hewlett-Packard Development Company, L.P., Spring, TX (US)

(72) Inventors: Hsiao-Jou Lin, Spring, TX (US); Kuan-Ting Wu, Taipei (TW); Alexander Williams, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/005,736

(22) PCT Filed: Jul. 17, 2020

(86) PCT No.: PCT/US2020/042558
§ 371 (c)(1),
(2) Date: Jan. 17, 2023

(87) PCT Pub. No.: WO2022/015325
PCT Pub. Date: Jan. 20, 2022

(65) Prior Publication Data
US 2023/0280842 A1    Sep. 7, 2023

(51) Int. Cl.
*G06F 3/0354* (2013.01)
*F25B 21/02* (2006.01)

(52) U.S. Cl.
CPC .......... *G06F 3/03543* (2013.01); *F25B 21/02* (2013.01); *F25B 2321/021* (2013.01)

(58) Field of Classification Search
CPC ........ A63F 13/285; A63F 13/67; G06F 3/016; G06F 3/03543; G06F 3/033; G06F 3/0202; G06F 3/03544; G06F 2203/0332; G06F 21/31; G06F 21/32; G06N 20/00; F25B 21/04
See application file for complete search history.

(56) References Cited

U.S. PATENT DOCUMENTS

| | | | | |
|---|---|---|---|---|
| 8,253,072 B2* | 8/2012 | Xiao | .................... | G06F 3/0383 |
| | | | | 219/209 |
| 8,612,064 B2* | 12/2013 | Tye | .......................... | G06F 1/20 |
| | | | | 219/482 |
| 2005/0284152 A1 | 12/2005 | Christiansen | | |
| 2013/0342461 A1 | 12/2013 | Ho et al. | | |

FOREIGN PATENT DOCUMENTS

| | | |
|---|---|---|
| CN | 104375668 A | 2/2015 |
| CN | 204155217 U | 2/2015 |
| CN | 105389026 A | 3/2016 |
| CN | 105528095 A | 4/2016 |
| CN | 106406581 A | 2/2017 |
| CN | 107227013 A | 10/2017 |
| WO | 2019/133482 A1 | 7/2019 |

* cited by examiner

*Primary Examiner* — Nelson M Rosario
(74) *Attorney, Agent, or Firm* — QUARLES & BRADY LLP (57) ABSTRACT

An input mouse may include a top button, a first wall rearward of the top button to underlie a palm of a user and a second wall forming an exterior of the input mouse. The first wall is formed from a material composition comprising a first polymer encapsulating thermally conductive particles. The second wall is formed from a thermally conductive material. A solid-state Peltier heat pump has a first face thermally coupled to the first wall and a second face thermally coupled to the second wall.

15 Claims, 5 Drawing Sheets

INPUT MOUSE TEMPERATURE CONTROL SYSTEM

BACKGROUND

Computing devices often receive selections or commands through an input mouse. Movement of the mouse generates signals that may result in movement of a cursor depicted on a screen of the computing device. Use of such a mouse involves positioning of one's hand on top of the mouse while moving the mouse, depressing a button or multiple buttons of the mouse and/or rolling a scroll wheel of the mouse.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example input mice that may offer enhanced comfort for users of the mice. The example input mice comprise temperature control systems that cool and/or heat the palm rest portion of the mouse or other portions of the mouse that come into contact with the user's hand. The example input mice provide enhanced thermal conduction to and from those surfaces that may contact the person's hand during use of the mouse (hand contact portions). The example input mice provide enhanced thermal conduction between the hand contact portions of the mice and other thermally conductive exterior walls or surfaces of the mice, or other heat sinks. The enhanced thermal conduction may result in enhanced dissipation of heat from the hand contact portions to reduce perspiration. The enhanced thermal conduction may result in enhanced distribution of heat to the hand contact portions for greater user comfort.

In some implementations, the hand contact portions of the mouse may have a first wall formed from a first material comprising a polymer that encapsulates a first concentration of thermally conductive particles, wherein the first wall is coated with a second material comprising a polymer that encapsulates a second concentration of thermally conductive particles, the second concentration of the coating being greater than the first concentration of the first wall. The coating may have a thickness less than that of first wall. The thickness of the coating and its higher concentration of thermally conductive particles provide enhanced thermal conductivity and enhanced thermal conducting uniformity. As a result, the coating greatly enhances the rate at which heat is transmitted to or received from the underlying first wall of hand contact portions of the mouse.

In some implementations, the mice include a solid-state Peltier (SSP) heat pump. The SSP heat pump may have a first face thermally coupled to the hand contact portion and a second opposite face thermally coupled to a heat sink or heat dissipating thermally conductive surface of the mouse. Depending upon the direction of electrical current, the SSP heat pump may either heat the first wall of the hand contact portion of the mouse or may cool the first wall of the hand contact portion of the mouse.

In some implementations, the first wall of the hand contact portion of the mouse is formed from a material composition comprising a polymer that encapsulates thermally conductive particles, wherein the SSP heat pump is thermally coupled between the first wall of the hand contact portion and an external thermally conductive second wall of the mouse. The external thermally conductive second wall of the mouse forms an exterior of the mouse that may be in less contact with the user's hand during use and serves to dissipate heat to the surrounding ambient environment. Examples of such an external thermally conductive second wall include, but are not limited to, a bottom wall or plate of the mouse and/or sidewalls of the mouse. In some implementations, the second wall of mouse may be integrally formed as a single unitary body with the first wall of the mouse that forms the top palm rest portion. In some implementations, the second wall of the mouse may be a separate panel that is distinct from the first wall that forms the top palm rest portion. Because the SSP heat pump is thermally coupled between the polymer encapsulated thermally conductive particles and the thermally conductive external second wall of the mouse, heating and cooling efficacy of the SSP heat pump may be enhanced.

In some implementations, the SSP heat pump is thermally coupled to the first wall of the hand contact portion and/or is thermally coupled to the thermally conductive exterior second wall by an internal support structure of the mouse, wherein the internal support structure is itself formed from a polymer that encapsulates thermally conductive particles. For example, a mouse may include support posts, columns or internal frame structures that support internal components, such as internal circuitry, or the outer walls of the mouse. Such internal support structures may be used as thermal conduits for conducting heat to and from the SSP heat pump. In such an implementation, enhanced thermal conductivity for the top palm rest portion is achieved with fewer, if any, modifications to the existing physical structure and/or size of the mouse. Such enhanced thermal conductivity for the top palm rest portion may be achieved by altering the material composition of the internal support structure to encapsulate thermally conductive particles.

Throughout this disclosure, the term "thermally coupled" may be used to describe a thermal connection between two components. For purposes of this disclosure, the phrase "thermally coupled" means that two components are connected by a single structure or a series of multiple different structures that are each thermally conductive such that heat may be transferred from one component to the other component through and across the structure or series of multiple different structures. For purposes of this disclosure, the phrase "thermally conductive" refers to the ability of a material to transmit heat at a rate of 10 W/mK or more. For example, unfilled plastics may have a thermal conductivity that is under 0.5 W/mK and would therefore not be considered "thermally conductive." The disclosed polymers with encapsulated thermally conductive particles have a thermal conductivity of 10 W/mK or more. In some of the disclosed implementations, the polymers with encapsulated thermally conductive particles have a thermal conductivity of 30 W/mK. Metals, such as aluminum have a thermal conductivity of approximately 200 W/mK. The overall thermal conductivity of a stack of different materials may depend upon the individual thermal conductivities of the materials.

Disclosed are example input mice that may include a top button, a first wall rearward of the top button to underlie a palm of a user and a second wall forming an exterior of the input mouse. The first wall is formed from a material composition comprising a first polymer encapsulating thermally conductive particles. The second wall is formed from a thermally conductive material. A SSP heat pump has a first face thermally coupled to the first wall and a second face thermally coupled to the second wall.

Disclosed are example input mice that may include a top button, a first thermally conductive wall rearward of the top button to underlie a palm of a user, a second thermally conductive wall on the exterior of the input mouse, a solid-state Peltier heat pump having a first face thermally coupled to the first wall and a second face thermally coupled to the second wall and an internal support structure thermally coupling the solid-state Peltier heat pump to one of the first wall and the second wall. The internal support structure may be formed from a polymer encapsulating thermally conductive particles.

Disclosed are example input mice that may include a top button, a first wall rearward of the top button to underlie a palm of a user, a second exterior thermally conductive wall and a coating over the first wall. The first wall may be formed from a material composition comprising a first polymer encapsulating a first concentration of thermally conductive particles, whereas the coating may comprise a second polymer encapsulating a second concentration of thermally conductive particles. The second concentration is greater than the first concentration. For example, in some implementations, the first wall may have a first percentage by weight of the thermally conductive particles while the second wall has a second greater percentage by weight of the thermally conductive particles. In some implementations, the first wall may have a first percentage by what volume of the thermally conductive particles on the second wall has a second greater percentage by volume of the thermally conductive particles.

Figure 1:
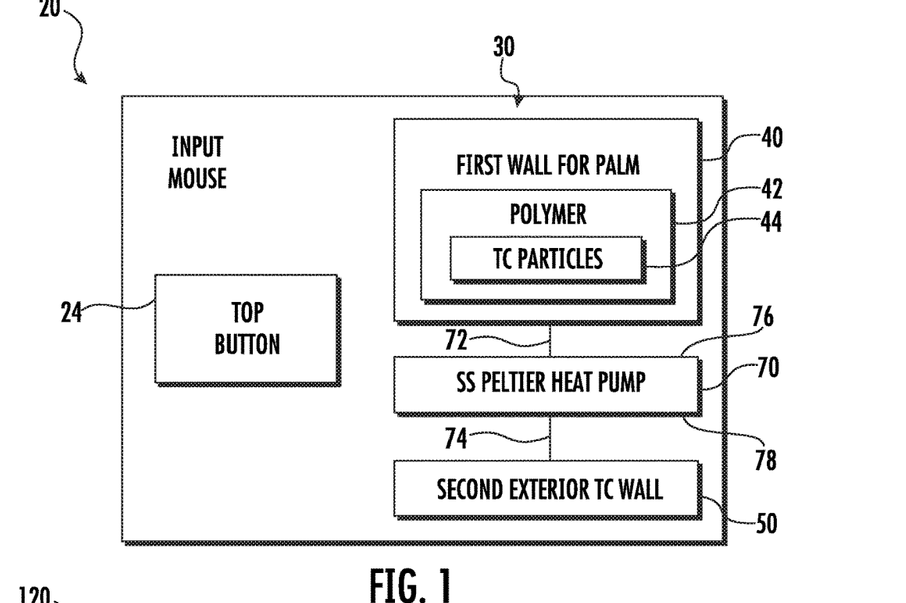
FIG. 1 is a block diagram schematically illustrating portions of an example input mouse having an example temperature control system.

FIG. 1 is a block diagram illustrating portions of an example input mouse 20. Input mouse 20 provides electrical input signals for a computer device. Input mouse 20 provides enhanced thermal conductivity for a first wall forming a top palm rest portion or temperature control surface of the mouse. Input mouse 20 comprises top button 24 and a temperature control system 30 formed by first wall 40, second wall 50 and solid-state (SS) Peltier heat pump 70.

Top button 24 comprises a component movably supported for manual depression on top of mouse 20 to provide input signals based upon such manual depression (downward movement in response to forces from a user's finger or fingers). In some implementations, top button 24 may be located on the left side of the mouse or the right side of mouse to provide click input. In some implementations, top button 24 may be generally centered to provide a mode selection or other input for mouse 20. In some implementations, top button 24 may comprise a scroll wheel that may be manually rotated to provide a first form of input or that may be depressed provide a second form of input. Top button 24 generally lies forward of first wall 40.

First wall 40 forms part of a top temperature control surface for which the temperature is controlled to provide enhanced comfort to the user of mouse 20. First wall 40 extends rearwardly of top button 24 and forms a palm rest portion of the exterior structural shell of input mouse 20. First wall 40 is located to underlie a user's palm during use of the mouse 20. As schematically shown by FIG. 1, first wall 40 is formed from a material composition comprising a polymer 42 that encapsulates thermally conductive particles 44. The encapsulated thermally conductive particles 44 provide first wall 40 with a reduced weight and lower cost as compared to metal materials and provides enhanced thermal conductivity (relative to dielectric materials such as ceramics and unfilled plastics) for enhanced temperature control.

In some implementations, the polymer may comprise an acrylonitrile butadiene styrene (ABS), polycarbonate/ABS (PC-ABS) and poly carbonate in combination with 0.3% to 15% thermally conductive particles 44 which serve as fillers in the polymeric material. In some implementations, the thermal conductive particles 44 may be selected from a group of particles consisting of nano-sized graphene, carbon nanotubes and graphite. In some implementations, so such thermal conductive particles 44 have a particle size of 10 nm up to 1 μm. In such implementations, first wall 40 may provide a radiation heat transfer emissivity coefficient of 0.8 to 0.99. In such implementations, first wall 40 may provide a thermal conductivity of 15 to 30 W/mK. In other implementations, first wall 40 may be formed from other polymers and/or may encapsulate other thermally conductive particles. In other implementations, first wall 40 may be formed other sizes of thermally conductive particles 44 and/or may have other relative ratios of the polymer and the encapsulated thermally conductive particles 44.

Second wall 50 comprises a thermally conductive wall that forms a heat sink or heat dissipating surface along the exterior of mouse 20. In some implementations, second wall 50 may comprise a metal plate such as aluminum, copper or silver. In some implementations, second wall 50 may comprise a polymer that encapsulates thermally conductive particles. For example, in some implementations, second wall 50 may comprise ABS, PC-ABS and poly carbonate in combination with 3 to 35% by weight thermally conductive particles or materials selected from a group of materials consisting of graphene, carbon nanotubes, graphite, aluminum, copper, silver, silicon carbide, aluminum nitride and boron nitride with the particle size of 0.1 to 10 μm. In some implementations, second wall 50 may have a thermal conductivity of 15 to 30 W/mK. In some implementations, second wall 50 may be formed from other thermally conductive materials and may have other compositions.

SSP heat pump 70, sometimes referred to as a thermoelectric cooler (TEC), operates on the Peltier effect, a heating or cooling effect brought about the electrical current passing through two conductors that are components of the heat pump. A voltage applied to free ends of the two dissimilar conductors coupled together creates a temperature difference. Due to the temperature difference, heat is transferred from one end of the couple conductors to the other. As a result, one side or face of the heat pump is cooled while the opposite face is simultaneously heated. In the example illustrated, the heat pump may be used for both heating and cooling, using one face for heating and the other face for cooling or by reversing polarity within the heat pump, causing a change in direction of the applied current and a change in the direction of heat transfer.

In some implementations, SSP heat pump 70 comprises an array of p-type and n-type semiconductor ceramic elements, such as Bismuth Telluride, as the two conductors. The array of elements is soldered electrically in series and thermally in parallel between the two ceramic plates. As direct current passes through the semiconductor elements from the n-type to p-type, the pump experiences a decrease in temperature at the ceramic plate coupled to the n-type element ("cold face") resulting in the absorption of heat. The heat is carried through the coupled conductors by electron transport and released on the opposite ceramic plate ("hot face") as heat as electrons move from a high to low energy state due to the p-type elements. The heat may be dissipated into a heat sink, released into the surrounding environment by a fan or both. The heat pumping capacity of pump 70 may be proportional to the magnitude of the current and number of n-type and p-type elements.

In some implementation's, SSP heat pump 70 operates from a DC power input such as from batteries or from a closed loop temperature control/power supply circuit. In such implementations, both linear and switching power supplies may be used to operate the SSP heat pump 70. In some implementations, electrical current supplied to heat pump 70 may be under the control of a controller comprising a processor which operates under the direction of instructions contained in a non-transitory computer-readable medium.

As schematically represented by lines 72, 74, SSP heat pump 70 is thermally coupled to first wall 40 and second wall 50. SSP heat pump 70 has a first face 76 thermally coupled to first wall 40 and a second opposite face 78 thermally coupled to second wall 50. Because the SSP heat pump is thermally coupled between the polymer encapsulated thermally conductive particles of first wall 40 and the thermally conductive external second wall 50 of the mouse 20, heating and cooling efficacy of the SSP heat pump 70 may be enhanced.

In some implementations, face 76 of SSP heat pump 70 may be in direct contact with first wall 40. In some implementations, face 76 may be indirectly connected to first wall 40 by intermediate thermally conductive structures. Likewise, in some implementations, face 78 of SSP heat pump 70 may be directly connected to or in contact with second wall 50. In some implementations, face 78 of SSP heat pump may be indirectly connected to second wall 50 by intermediate thermally conductive structures.

During one user selected mode of operation, SSP heat pump 70 is supplied with current in a direction such that face 76 is the "hot face" wherein heat is supplied to first wall 40, heating first wall 40 to warm the palm of the user of mouse 20. During another user selected mode of operation, SSP heat pump 70 is supplied with current in a direction such that face 76 is the "cold face", drawing heat from first wall 40 to cool the palm of the user mouse 20. In some implementations, mouse 20 may comprise a controller which allows the user to select either of the two modes of operation for mouse 20. In some implementations, top button 24 may serve as an input device by which the user may select either of the two modes. In some implementations, mouse 20 may offer one of the above two disclosed modes, switching between an off state and on state in which wall 40 is heated or switching between an off state and an on state in which wall 40 is cooled.

Figure 2:
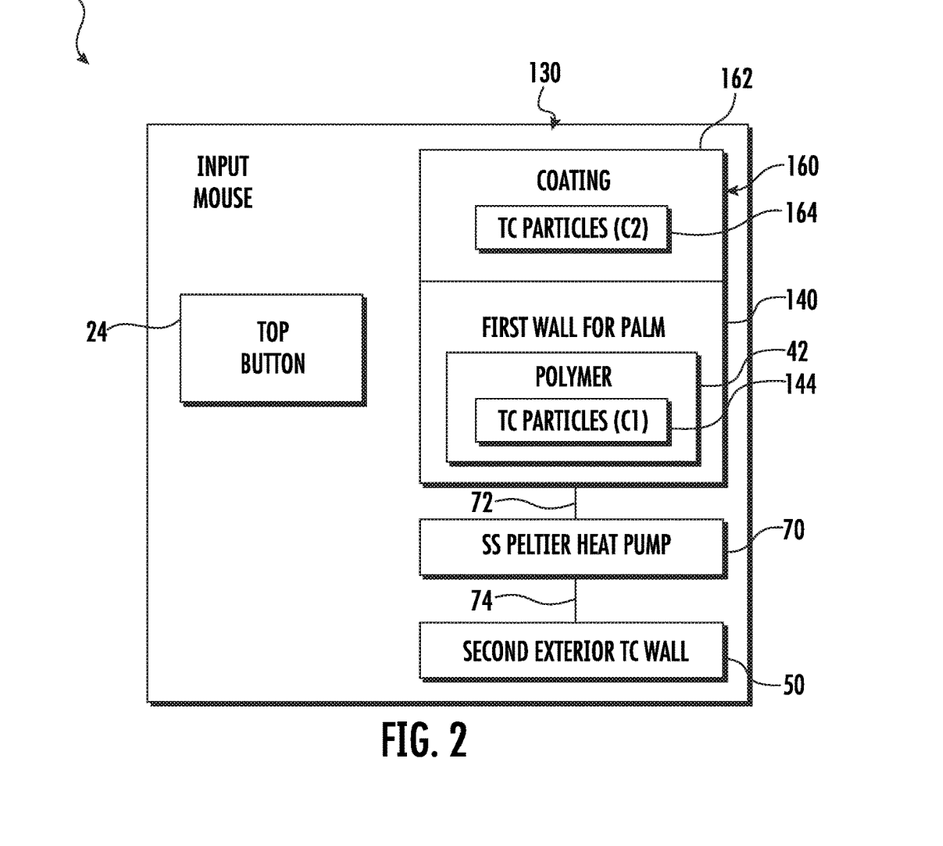
FIG. 2 is a block diagram schematically illustrating portions of an example input mouse having an example temperature control system.

FIG. 2 in a block diagram schematically illustrating portions of an example input mouse 120. FIG. 2 illustrates an example of how a coating may be applied to the first wall 40 and may be provided with a concentration of thermally conductive particles that is greater than the concentration of thermally conductive particles of wall 40 to further enhance the rate of thermal conductivity along the external surface of mouse 20. Input mouse 120 comprises top button 24 and a temperature control system 130 provided by first wall 140, second wall 50 and coating 160.

Top button 24, second wall 50 and coating 160 are described above with respect to input mouse 20. First wall 140 is similar to first wall 40 described above except the first wall 140 comprises thermally conductive particles 144 encapsulated within polymer 42. Thermally conductive particles 144 are similar to thermally conductive particles 44 except that thermally conductive particles 144 are disclosed as having a first concentration C1 by weight. As described above, the polymer 42 may comprise an acrylonitrile butadiene styrene (ABS), polycarbonate/ABS (PC-ABS) and polycarbonate in combination with 0.3% to 15% thermally conductive particles 144 which serve as fillers in the polymeric material. In some implementations, the thermal conductive particles 144 may be selected from a group of particles consisting of nano-sized graphene, carbon nanotubes and graphite. In some implementations, such thermal conductive particles 44 have a particle size of 10 nm up to 1 μm. In such implementations, first wall 140 may provide a radiation heat transfer emissivity coefficient of 0.8 to 0.99. In such implementations, first wall 140 may provide a thermal conductivity of 15 to 30 W/m K.

Coating 160 comprises a thin layer of material that coats and conforms to the exterior of first wall 140. Coating 160 has a thickness of no greater than 25 μm. In some implementation, coating 160 is fully supported by first wall 140 and does not offer structural support for the forces exerted upon first wall 140 by user's hand during use of mouse 120.

In the example illustrated, coating 160 comprises a polymer 162 encapsulating thermally conductive particles 164. Coating 160 has a second concentration C2 of the thermally conductive particles 164 that is greater than the first concentration C1 of thermally conductive particles 144 of first wall 140. In some implementations, thermally conductive particles 144 and thermally conductive particles 164 are of the same material and have the same average individual particle size. In some implementations, thermally conductive particles 144 and thermally conductive particles 164 may be formed from different materials and/or may have different average individual particle sizes.

First wall 140 and coating 160 cooperate to provide enhanced thermal conductivity. First wall 140 provides the structural support for the outer enclosure shell of mouse 120, withstanding the forces exerted upon it by the user's hand. Because coating 160 does not provide any substantial structural support, coating 160 may be extremely thin and provided with a higher concentration of thermally conductive particles to more uniformly spread heat or more uniformly absorb heat along the exterior surface of mouse 20. Coating 160 is not a limiting factor in the dissipation or spreading of heat along the external surface of the palm rest portion of mouse 20 defined by coating 160 which rests upon first wall 140. The higher concentration of thermally conductive particles 164 in coating 160 provides coating 160 with a greater thermal conductivity such that heat (either being supplied to wall 140 or drawn from wall 140) is more quickly and uniformly dispersed or absorbed along the exterior surface of the thermally controlled portions of mouse 120 that underlie the palm of the user's hand.

In some implementations, polymer 162 comprises a polymer selected from the group of polymers consisting of polyurethane, polyacrylic, polyester, polystyrene, epoxy and polycarbonate. In such implementations, thermally conductive particles 164 may be selected from a group of thermally conductive particles consisting of graphene, carbon nanotubes, graphite, aluminum, copper, silver, silicon carbide, aluminum nitride and boron nitride. Each of such particles may have a particle size of less than 10 μm. The set of thermally conductive particles constitute 0.5 to 30% by weight of coating 160. In such implementations, the coating 160 may have a thermal conductivity of 10 W/mK or more. In some implementations, the coating 160 may have a thermal conductivity of 50 to 100 W/mK.

In the example illustrated, input mouse 120 omits SSP heat pump 70. In such an implementation, first wall 140 is directly thermally coupled to second wall 50 by thermally conductive structures represented by lines 72, 74 which continuously extend between first wall 140 and second wall 50. As shown by broken lines, in some implementations, input mouse 120 may additionally comprise SSP heat pump 70. As described above with respect to input mouse 20, SSP heat pump 70 may be thermally coupled between wall 140 and wall 50. Such thermal coupling may be through direct contact of pump 70 with either or both of walls 140, 50 or may be facilitated by intermediate thermally conductive structures that are located or sandwiched between pump 70 and first wall 140 and/or between pump 70 and second wall 50.

Figure 3:
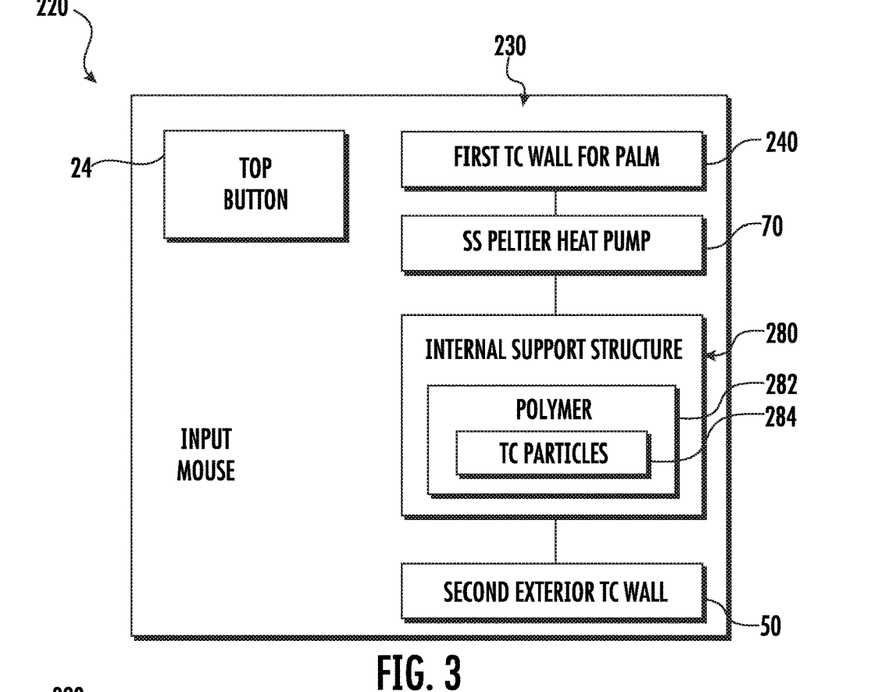
FIG. 3 is a block diagram schematically illustrating portions of an example input mouse having an example temperature control system.

FIG. 3 is a block diagram schematically illustrating portions of an example input mouse 220. FIG. 3 illustrates an example of how existing internal support structures of an input mouse may be used to thermally couple a heat pump to a heat sink or external heat dissipative surface of the mouse. Input mouse 220 comprises top button 24 and a temperature control system 230 provided by first wall 240, second wall 50, SSP heat pump 70 and internal support structure 280. Top button 24, second wall 50 and SSP heat pump 70 are each described above.

First wall 240 forms part of a top temperature control surface for which the temperature is controlled to provide enhanced comfort to the user of mouse 220. First wall 240 extends rearwardly of top button 24 and forms a palm rest portion of the exterior structural shell of input mouse 220. First wall 240 is located to underlie a user's palm during use of the mouse 20. In some implementations, first wall 40 is similar to first wall 40 described above in that first wall 240 is formed from a material composition comprising a polymer 42 that encapsulates thermally conductive particles 44 (shown in FIG. 1). The encapsulated thermally conductive particles 44 provide first wall 240 with a reduced weight and lower cost as compared to metal materials and provides enhanced thermal conductivity for enhanced temperature control.

In some implementations, the polymer may comprise an acrylonitrile butadiene styrene (ABS), polycarbonate/ABS (PC-ABS) and poly carbonate in combination with 0.3% to 15% thermally conductive particles 44 which serve as fillers in the polymeric material. In some implementations, the thermal conductive particles 44 may be selected from a group of particles consisting of nano-sized graphene, carbon nanotubes and graphite. In some implementations, such thermal conductive particles 44 have a particle size of 10 nm up to 1 μm. In such implementations, first wall 40 may provide a radiation heat transfer emissivity coefficient of 0.8 to 0.99. In such implementations, first wall 40 may provide a thermal conductivity of 15 to 30 W/mK. In other implementations, first wall 40 may be formed from other polymers and/or may encapsulate other thermally conductive particles. In other implementations, first wall 40 may be formed other sizes thermally conductive particles 44 and/or may have other relative ratios of the polymer and the encapsulated thermally conductive particles 44.

In some implementations, first wall 240 may comprise other thermally conductive materials. In some implementations, first wall 240 may omit embedded or encapsulated thermally conductive particles. For example, in some implementations, first wall 240 may be formed from a solid mass of thermally conductive material, such as a metal such as aluminum, copper or the like. Although not illustrated, in some implementations, mouse 220 may additionally comprise coating 160 illustrated in FIG. 2 and described above with respect to input mouse 120. In such implementations, first wall 240 may be similar to first wall 140 described above, wherein the first wall 240 has a first concentration C1 of thermally conductive particles encapsulated in a polymer and wherein the coating has a second higher concentration C2 of thermally conductive particles encapsulated in a polymer.

Internal support structure 280 comprises a structure located within an interior of input mouse 220 that serves to support an exterior wall of input mouse 220 and/or internal component of input mouse 220. For example, internal support structure 280 may comprise a column or post that supports an outer shell or panel of mouse 220 or an internal printed circuit board of mouse 220. Internal support structure 280 may comprise a frame, bracket, standoff, leaf spring or the like which movably supports a scroll wheel buttons, slide bar or other movable components of input mouse 220.

Internal support structure 280 is thermally conductive to thermally couple, or be part of a thermal path, that connects SSP heat pump 70 to second exterior thermally conductive wall 50. In such an implementation, enhanced thermal conductivity for the top palm rest portion is achieved with fewer, if any, modifications to the existing physical structure and/or size of the mouse 220. In some implementations, internal support structure 280 may directly contact heat pump 70 and/or wall 50. In some implementations, internal support structure 280 may be indirectly thermally coupled are connected to either or both of heat pump 70 and wall 50. For example, internal support structure 280 may be joined to or molded as a single unitary body with a thermally conductive extension, tab or projection that makes thermal contact with heat pump 70 and/or second wall 50.

As schematically shown in FIG. 3, internal support structure 280 is formed from a material comprising polymer 282 and thermally conductive particles 284. In such an implementation, the internal support structure 280 may be molded into the chosen shape so as to serve its internal physical support function for mouse 220 also serving as a heat sink and/or thermally conductive structure thermally coupling pump 70 to wall 50. In some implementations, polymer 282 and thermally conductive particles 284 may have the same composition as polymer 42 and thermally conductive particles 44. In some implementations, polymer 282 and thermally conductive particles 284 may have other compositions depending upon the heat provided by SSP heat pump 70 and the characteristics of walls 240 and 50. In yet other implementations, internal support structure 280 may be formed from other thermally conductive materials.

Figure 4:
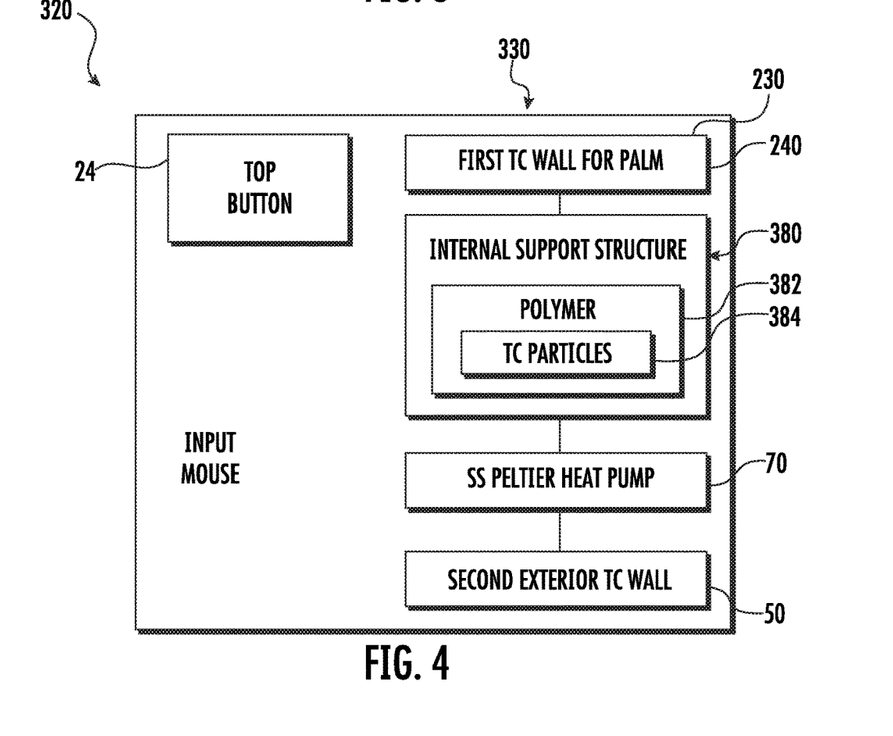
FIG. 4 is a block diagram schematically illustrating portions of an example input mouse having an example temperature control system.

FIG. 4 is a block diagram schematically illustrating portions of an example input mouse 320. FIG. 4 illustrates an example of how existing internal support structures of a mouse may be modified to thermally couple a heat pump to an external palm rest portion of a mouse. Input mouse 320 is similar to input mouse 220 described above except that mouse 320 comprises a temperature control system 330 that utilizes an internal support structure 380 which is physically coupled between heat pump 70 and first wall 240 to thermally couple heat pump 70 to first wall 240. The remaining components of mouse 320 which correspond to components of input mouse 220 are numbered similarly.

Internal support structure 380 is similar to internal support structure 280 described above but for its location. Internal support structure 380 is thermally conductive to thermally couple, or be part of a series of structures that thermally couple, SSP heat pump 70 to first exterior thermally conductive wall 240. In such an implementation, enhanced thermal conductivity for the top palm rest portion is achieved with fewer, if any, modifications to the existing physical structure and/or size of the mouse 320. In some implementations, internal support structure 380 may directly contact heat pump 70 and/or wall 50. In some implementations, internal support structure 380 may be indirectly thermally coupled or connected to either or both of heat pump 70 and wall 240. For example, internal support structure 380 may be joined to or molded as a single unitary body with a thermally conductive extension, tab or projection that makes thermal contact with heat pump 70 and/or first wall 240.

As schematically shown in FIG. 4, internal support structure 380 is formed from a material comprising polymer 382 and thermally conductive particles 384. In such an implementation, the internal support structure 380 may be molded into the chosen shape so as to serve its internal physical support function for mouse 320 also serving as a heat sink and/or thermally conductive structure thermally coupling pump 70 to wall 50. In some implementations, polymer 382 and thermally conductive particles 384 may have the same composition as polymer 42 and thermally conductive particles 44. In some implementations, polymer 382 and thermally conductive particles 384 may have other compositions depending upon the heat provided by SSP heat pump 70 and the characteristics of walls 240 and 50. In yet other implementations, internal support structure 380 may be formed from other thermally conductive materials.

Figure 5:
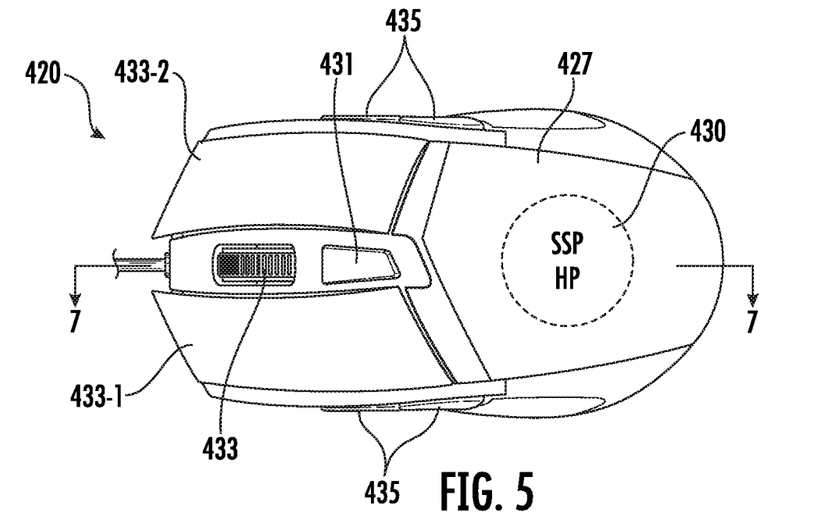
FIG. 5 is a top view of an example input mouse having an example temperature control system.
Figure 6:
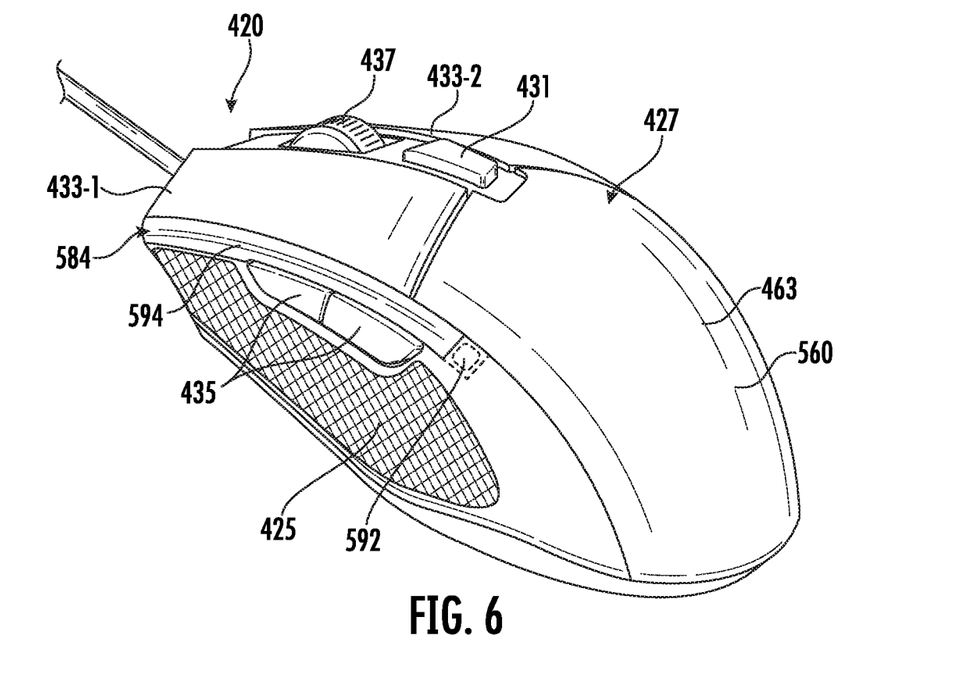
FIG. 6 is a rear perspective view of the example input mouse of FIG. 5.
Figure 7:
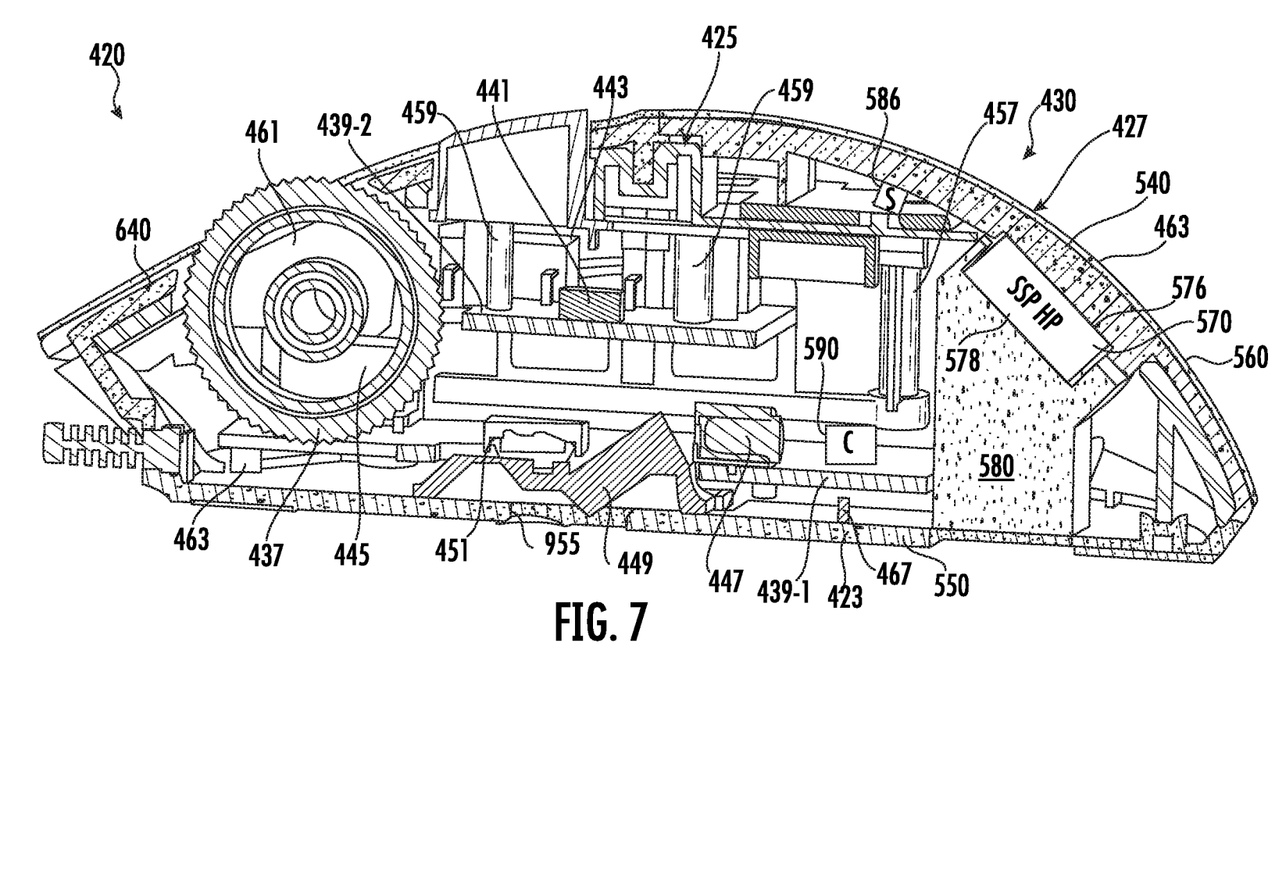
FIG. 7 is a sectional view of the example input mouse of FIG. 5 taken along line 7-7 of FIG. 5.

FIGS. 5-7 illustrate portions of an example input mouse 420. FIGS. 5-7 illustrate a particular implementation of the input mice shown in FIGS. 1-4. Input mouse 420 comprises an enclosure provided by mouse enclosure portions such as bottom plate 423, sidewalls 425, internal support structures 426 and cover 427. Input mouse 420 further comprises manual input components in the form of center top button 431, side top buttons 433-1, 433-2, side buttons 435 and scroll wheel 437. Input mouse 420 additionally comprises printed circuit boards 439-1, 439-2, manual input sensors 441, 443 and 445; and an optical sensing system comprising light source 447, lens 449 and optical sensor 445.

Bottom plate 423 forms a bottom of mouse 420 and supports the overlying components of mouse 420. Bottom plate 423 comprises an opening 455 for the optical sensing system. Sidewalls 425 rise from bottom plate 423 and include openings for side buttons 435.

Internal support structures 426 extend from bottom plate 423 between sidewalls 425. Internal support structures 426 support sidewalls 425 and cover 427. Internal support structures 426 further support center top button 431, top side buttons 433, side buttons 435 and scroll wheel 437. Internal support structures 426 additionally support internal electronic components of mouse 420 including printed circuit boards 439-1, 439-2 (collectively referred to as printed circuit boards 439), manual input sensors 441, 443 and 445. In the example illustrated, internal support structures 426 comprises posts 457 for-supporting cantilevered portions of side buttons 435, posts 459 for supporting printed circuit board 439-2, bearing 461 for rotatably supporting scroll wheel 437 and standoffs 467 for supporting printed circuit board 439-1.

Cover 427 extends over a top of mouse 420. Cover 427 comprises a palm rest portion 463 which is rearward of the manual input components: center top button 431, side top buttons 433-1, 433-2, scroll wheel 437 and side buttons 435. In the example illustrated, side top buttons 433 are integrally formed as part of a single unitary body with cover 427, wherein side top buttons 433 resiliently flex to allow depression of such buttons.

Center top button 431 and side top buttons 433 are each cantilevered by the internal support structures 426 for resilient movement. Depression of such buttons results in the buttons interacting with manual input sensors 441 and 443 which may be in the form of switches such that electrical signals are produced for transmission to the computing device as input. Scroll wheel 437 is rotatably supported by bearing 461 wherein its rotation is sensed by rotational sensor 445 which outputs electrical signals for the computing device based upon such rotation. Printed circuit board 439-1 supports rotational sensor 445, light source 447 and optical sensor 451. Printed circuit board 439-2 supports manual input sensors 441 and 443.

Light source 447 directs light through lens 449 which focuses the light through opening 455. The light is then reflected back through opening 455 and focused by lens 449 to optical sensor 451 which outputs electrical signals to the computing device based upon the sensed reflected light. In some implementations, the optical sensing system provided by light source 447, lens 449 and optical sensor 451 may be replaced with the ball or wheel which physically contacts the underlying medium and moves in response to movement of mouse 420, wherein electrical signals are output by mouse 420 to the computing device based upon the sensed movement of the ball or wheel.

The above description of mouse 420 is one example of a possible construction for mouse 420. Mouse 420 may have a variety of other constructions. For example, in some implementations, mouse 420 may omit center top button 431 and its associated input sensor 441, may omit side buttons 435 and their associated input sensors 443 and/or may omit scroll wheel 437 and its associated rotational sensor 445. In some implementations, portions of bottom plate 423, sidewalls 425, internal support structures 426 and/or cover 427 may be formed as a single integral unitary body or may be formed a separate component snapped, fastened otherwise joined to one another. For example, in some implementations, bottom plate 423 and internal support structures 426 may be integrally formed as a single unitary body.

As with input mice 20, 120, 220 and 320 described above, input mouse 420 comprises a temperature control system 430 for controlling and/or regulating the temperature of palm rest portion 463. Temperature control system 430 comprises first wall 540, second wall 550, coating 560 (shown with an exaggerated thickness for purposes of illustration), SSP heat pump 570, internal heat sink 580, optical indicator 584, temperature sensor 586 and controller 590.

First wall 540 comprises a wall that forms palm rest portion 463 of cover 427. First wall 540 underlies coating 560 and is sandwiched between coating 560 and heat pump 570. First wall 540 is formed from a thermally conductive material. In some implementations, first wall 540 has a composition similar to first wall 140 described above. As described above with respect to first wall 140, first wall 540 is formed from a material composition comprising a polymer 42 that encapsulates thermally conductive particles 144 (schematically shown in FIG. 2). The encapsulated thermally conductive particles 44 provide first wall 540 with a reduced weight and lower cost as compared to metal materials and provide enhanced thermal conductivity for enhanced temperature control.

In some implementations, the polymer may comprise an acrylonitrile butadiene styrene (ABS), polycarbonate/ABS (PC-ABS) and poly carbonate in combination with 0.3% to 15% thermally conductive particles 44 which serve as fillers in the polymeric material. In some implementations, the thermal conductive particles 44 may be selected from a group of particles consisting of nano-sized graphene, carbon nanotubes and graphite. In some implementations, so such thermal conductive particles 44 have a particle size of 10 nm up to 1 µm. In such implementations, first wall 540 may provide a radiation heat transfer emissivity coefficient of 0.8 to 0.99. In such implementations, first wall 540 may provide a thermal conductivity of 15 to 30 W/mK. In other implementations, first wall 540 may be formed from other polymers and/or may encapsulate other thermally conductive particles. In other implementations, first wall 540 may be formed other sizes thermally conductive particles 44 and/or may have other relative ratios of the polymer and the encapsulated thermally conductive particles 44.

Second wall 550 comprises a wall that forms a portion of bottom plate 423. Second wall 550 is thermally conductive. In some implementations, second wall 550 is similar to second wall 50 described above. In some implementations, second wall 550 may comprise a metal plate such as aluminum, copper or silver. In some implementations, second wall 550 may comprise a polymer that encapsulates thermally conductive particles. For example, in some implementations, second wall 50 may comprise ABS, PC-ABS and poly carbonate in combination with 3 to 35% by weight thermally conductive particles or materials selected from a group of materials consisting of graphene, carbon nanotubes, graphite, aluminum, copper, silver, silicon carbide, aluminum nitride and boron nitride with the particle size of 0.1 to 10 µm. In some implementations, second wall 550 may have a thermal conductivity of 15 to 30 W/mK. In some implementations, second wall 550 may be formed from other thermally conductive materials and may have other compositions.

Coating 560 conforms to and overlies first wall 540. Coating 560 may be similar to coating 160 described above. In some implementations, coating 560 is sprayed onto first wall 540. In some implementations, coating 560 is laminated onto first wall 540. As described above with respect to coating 160, coating 560 has a thickness of no greater than 25 µm. In some implementation, coating 560 is fully supported by first wall 540 and does not offer structural support for the forces exerted upon first wall 540 by user's hand during use of mouse 420.

In the example illustrated, coating 560 comprises a polymer 162 (schematically shown in FIG. 2) encapsulating thermally conductive particles 164 (schematically shown in FIG. 2). Coating 560 has a second concentration C2 of the thermally conductive particles 164 that is greater than the first concentration C1 of thermally conductive particles of first wall 540. In some implementations, thermally conductive particles 144 and thermally conductive particles 164 are of the same material and have the same average individual particle size. In some implementations, thermally conductive particles 144 and thermally conductive particles 164 may form from different materials and/or may have different average individual particle sizes.

First wall 540 and coating 560 cooperate to provide enhanced thermal conductivity. First wall 540 provides the structural support for the outer enclosure shell of mouse 420, withstanding the forces exerted upon it by the user's hand. Because coating 560 does not provide any substantial structural support, coating 560 may be extremely thin and provided with a higher concentration of thermally conductive particles to more uniformly spread heat or more uniformly absorb heat along the exterior surface of mouse 420. Coating 560 is not a limiting factor in the dissipation or spreading of heat along the external surface of the palm rest portion of mouse 420 defined by coating 560 which rests upon first wall 540. The higher concentration of thermally conductive particles 164 in coating 560 provides coating 560 with a greater thermal conductivity such that heat (either being supplied to wall 540 or drawn from wall 540) is more quickly and uniformly dispersed or absorbed along the exterior surface of the thermally controlled portions of mouse 420 that underlie the palm of the user's hand.

In some implementations, polymer 162 comprises a polymer selected from the group of polymers consisting of polyurethane, polyacrylic, polyester, polystyrene, epoxy and polycarbonate. In such implementations, thermally conductive particles 164 may be selected from a group of thermally conductive particles consisting of graphene, carbon nanotubes, graphite, aluminum, copper, silver, silicon carbide, aluminum nitride and boron nitride. Each of such particles may have a particle size of less than 10 µm. The set of thermally conductive particles constitute 0.5 to 30% by weight of coating 160. In such implementations, the coating 560 may have a thermal conductivity of 10 W/mK or more. In some implementations, the coating 560 may have a thermal conductivity of 50 to 100 W/mK.

Solid-state Peltier heat pump 570 is similar to heat pump 70 described above. In the example illustrated, heat pump 570 has a first face 576 thermally coupled to first wall 540 and a second opposite face 578 thermally coupled to second wall 550 by internal heat sink 580. In the example illustrated, first face 576 is in direct contact with an inner surface of first wall 540.

Heat sink 580 assists in thermally coupling face 578 of heat pump 570 to second wall 550 of bottom plate 423. In the example illustrated, heat sink 580 comprise a mass of thermally conductive material extending between face 578 and second wall 550. In some implementations, heat sink 580 is formed from polymer 382 and thermally conductive particles 384 described above with respect to mouse 320.

Optical indicator 584 extends along or is exposed to an exterior of mouse 420. Optical indicator 584 is to provide a user with visible information. In some implementations, the visible information may be the current state of heat pump 570, for example whether heat pump 570 is currently in an off state, whether heat pump 570 is currently heating palm rest portion 463 or whether heat pump 570 is currently cooling palm rest portion 463. In some implementations, the visible information may indicate the current sensed temperature of palm rest portion 563.

In the example illustrated, optical indicator 584 comprises a light source 592 (schematically illustrated in FIG. 6) that directs light through a light guide 594 situated along an exterior of mouse 420. In the example illustrated, light source 592 may comprise a light emitting diode while light guide 594 comprises a bar of transparent material at a top of side walls 425, alongside buttons 433. In other implementations, optical indicator 584 may omit light guide 594, providing information based upon the color, brightness, blinking frequency or illumination state of a light emitting diode or multiple light emitting diodes. In some implementations, portions of sidewall 425 or cover 427 may be translucent or transparent, facilitating viewing of a light source therethrough and facilitating the communication of information to the user of mouse 420.

Temperature sensor 586 (schematically shown) comprise a sensor located to output electrical signals indicating the current surface or actual material temperature of palm rest portion 463. In some implementations, temperature sensor 586 may comprise multiple temperature sensors located along palm rest portion 463. Temperature sensor 586 transmits such temperature indicating signals to controller 590.

Controller 590 (schematically shown) comprises a processing unit, such as an integrated circuit, that carries out instructions contained in a non-transitory computer-readable medium such as software or logic circuitry encoded on a printed circuit board. Controller 590 controls the operation of heat pump 570 and optical indicator 584 based upon signals from temperature sensor 586 and/or input received through a manual input, such as top center button 431, top side buttons 433 or side buttons 435. In some implementations, controller 590 may control the operation of heat pump 570 and optical indicator 584 additionally based in part upon signals received from the computing device. Controller 590 may be operable in one of various user selected modes which may be chosen by a user using buttons 431, 433 or 435 to choose the mode or by user choosing the mode from the computing device which communicates with mouse 420.

In one example mode of operation, controller 590 outputs control signals to light source 592 to optically indicate the current operational state of temperature control system 430, the current state of heat pump 570. For example, controller 590 may cause light source 592 to illuminate light guide 594 with the first color, such as red, when palm rest portion 463 is being heated by heat pump 570. Controller 590 may alternatively cause light source 592 to illuminate light guide 594 with a second color, such as blue, when heat pump 570 is cooling palm rest portion 463. As noted above, the state may be communicated using optical indicator 584 in other fashions such by the frequency of light bursts, the brightness of light or the illumination state (on or off) of optical indicator 584.

In another example mode of operation, controller 590 may output control signals to light source 592 to optically indicate the current temperature of palm rest portion 463 as sensed by sensor 586. For example, controller 590 may cause light source 592 to illuminate light guide 594 with a series of changing colors or animations which are dependent upon the sensed temperature. In some implementations, controller 590 may alter the frequency at which light pulses are provided by light source 592 based upon the sensed temperature.

In some implementations, controller 590 may output signals causing both the current temperature and the current state to be communicated to the user. For example, the frequency or number of pulses may indicate the current temperature, whereas a color indicates the current heating/cooling/off state, or vice versa. In some implementations, pairs of light pulses may be provided intermittently, the first of the light pulses indicating one of the current temperatures and current heating/cooling state and a second of the light pulses indicating the current sensed temperature.

In some implementations, heat pump 570 may provide adjustable amount of heat or an adjustable amount of cooling to palm rest portion 463. In such an implementation, controller 590 may output control signals causing the optical indicator 584 to indicate the current target heating or cooling temperature or current heating/cooling temperature setting for heat pump 570. For example, the brightness of light provided by optical indicator 584 may vary depending upon the set or target heating or cooling temperature for heat pump 570. In some implementations, controller 590 may output control signals causing optical indicator 584 to emit various series or combination of optical emissions which indicate the current temperature of palm rest portion 463, the off/heating/cooling state of heat pump 570 and the set target heating/cooling temperature for heat pump 570.

In some implementations, controller 590, following instructions contained in the non-transitory computer either readable medium, may automatically actuate heat pump 570 based upon the sensed temperature of palm rest portion 463. For example, in response to receiving signals from sensor 586 indicating the temperature of palm rest portion 463 exceeding a user established or preestablished temperature threshold, controller 590 may automatically turn on heat pump 570 and actuate heat pump 570 to a cooling state in which palm rest portion 463 is cooled or may increase the cooling level being provided by the already on heat pump 570. In response to receiving signals from sensor 586 indicating the temperature palm rest portion 463 being less than a user established or preestablished temperature threshold, controller 590 may automatically turn on heat pump 570 and actuate heat pump 570 to a heating state in which palm rest portion 463 is heated by heat pump 570 or may increase the heating level being provided by the already on heat pump 570. In some implementations, controller 590 may have a memory storing a heating/cooling pattern with multiple temperature set points, wherein the control signals are output to heat pump 570 to follow the pre-established heating or cooling regimen or pattern. In some implementations, some of the above-described modes of operation may be omitted from mouse 420.

Figure 8:
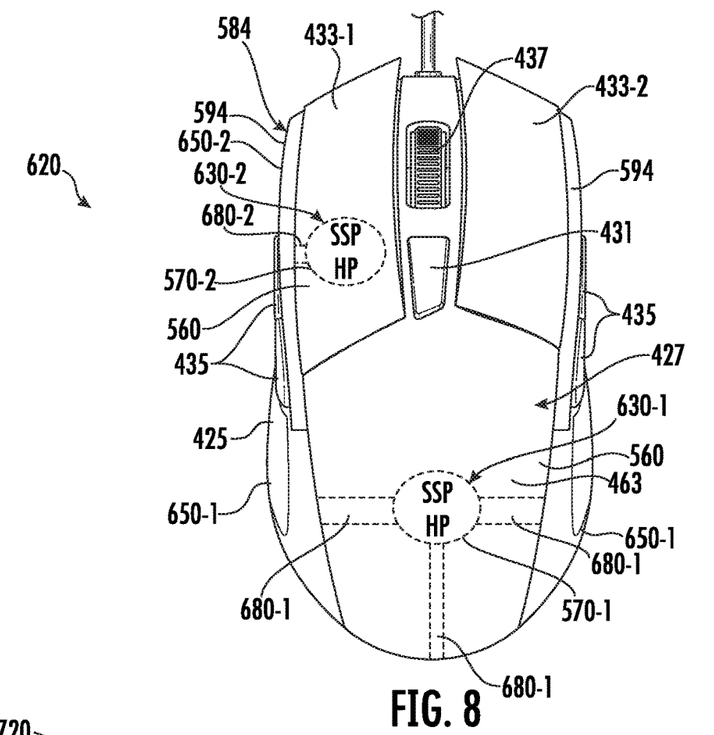
FIG. 8 is a top view of an example input mouse having example temperature control systems.

FIG. 8 is a top view illustrating portions of an example input mouse 620. Input mouse 620 is similar to input mouse 420 described above except that input mouse 620 comprises two temperature control systems 630-1 and 630-2 which may be independently under the control of controller 590 (shown and described above with respect to mouse 420). Those remaining components or structures of input mouse 620 which correspond to components of mouse 420 are numbered similarly and/or are shown in FIGS. 5-7 and described above with respect to mouse 420.

Like temperature control system 430, temperature control system 630-1 controls and/or regulates the temperature of palm rest portion 463. Temperature control system 630 comprises first wall 540 (shown in FIG. 6), coating 560, solid-state Peltier heat pump 570 (schematically illustrated), second wall 550 (shown in FIG. 7), heat sinks 580-1 (shown in FIG. 7), third walls 650-1 and heat sinks 680-1. Third walls 650-1 comprises walls that are a part of sidewall 425 which are formed from a thermally conductive material. In some implementations, third walls 650-1 are formed from the same material composition as second wall 550.

Heat sinks 680-1 are similar to heat sink 580. Heat sinks 680 comprise blocks of thermally conductive material which thermally couple face 578 of heat sink 570-1 (which is similar to heat sink 570 described above) to third walls 650-1. As a result, third walls 650-1, which are part of sidewalls 425, serve to absorb and/or distribute heat depending upon whether heat pump 570-1 of heating or cooling first wall 540 and coating 560 on palm rest portion 463.

Temperature control system 630-2 controller regulates the temperature of those portions of cover 427 forming top side buttons 433. Temperature control system 630-2 may be controlled as described above with respect to tempter control system 430. Temperature control system 630-2 comprises first wall 640 (shown in FIG. 7), second wall 650-2, coating 560, solid-state Peltier heat pump 570-2 (schematically shown), and heat sink 680-2.

First wall 640 comprises a wall that forms a portion or an entirety of button 433-1. First wall 640 may have the same material composition as first wall 540 described above. As noted above, in some implementations, first wall 540 may be integrally formed as part of a single unitary body with first wall 640. Coating 560 coats first wall 640 and has a composition as described above.

Solid-state Peltier heat pump 570-2 is similar to heat pump 570-1 except that heat pump 570-2 has a first face 576 (shown in FIG. 6) thermally coupled to first wall 640 and a second face 578 (shown in FIG. 7) which is thermally coupled to second wall 650-2 by heat sinks 680-2. In the example illustrated, second wall 650-2 comprises a portion or the entirety of light guide 594. Second wall 650-2 may have a material composition similar to that of second wall 550. Heat sinks 680-2 is similar to heat sink 680-1 except that heat sink 680-2 thermally couples face 578 of heat pump 570-2 to second wall 650-2.

Although not shown, a similar temperature control system 630-2 may be provided for button 433-2. In some implementations, a single temperature control system, such as temperature control system 630-2 may be used to control the temperature of both buttons 433. In such an implementation, a single heat pump 570-2 has a first face thermally coupled to both of buttons 433-1, 433-2 and a second face thermally coupled to both of light guides 594 on opposite sides of mouse 620.

Temperature control systems 630-1 and 630-2 facilitate temperature control of palm rest portion 463 and the input buttons 433. As a result, a larger top surface of cover 427 may be heated or cooled. In some implementations, the palm rest portion 463 may be differently heated or cooled as compared to buttons 433.

Figure 9:
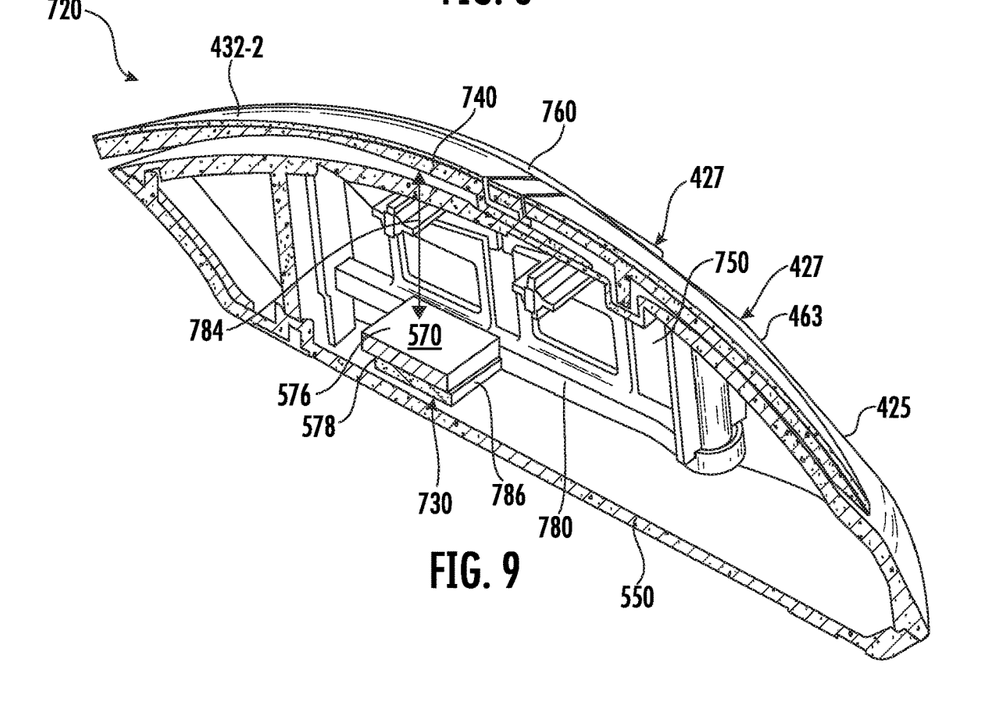
FIG. 9 is a sectional view of an example input mouse having an example temperature control system.

FIG. 9 is a sectional view illustrate portions of an example input mouse 720. FIG. 9 illustrates an example of how an existing internal support structure of a mouse may be modified for use in thermally coupling a heat pump to a thermally conductive external heat dissipating wall. Mouse 720 is similar to mouse 420 except that mouse 720 comprises temperature control system 730. Those remaining components of mouse 720 which correspond to components of mouse 420 are numbered similarly, are shown in FIGS. 5-7 and are described above with respect to FIGS. 5-7.

Temperature control system 730 comprises first wall 740, second wall 750, coating 760, solid-state Peltier heat pump 570 and internal support structure 780. First wall 740 is similar to first wall 540 described above. First wall 740 has a material composition similar to that of first wall 540 (described above). In the example illustrated, first wall 740 comprises a portion of cover 427 which forms input buttons 433 and palm rest portion 463.

Second wall 750 comprises a wall that forms a portion of sidewall 425. Second wall 750 is thermally conductive. In some implementations, second wall 750 has a material composition similar to that of second wall 550 described above. Coating 760 extends over first wall 740 and has a thickness and material composition similar to coating 560 described above. Solid-state Peltier heat pump 570 is described above with respect to mouse 420. As schematically represented by arrow 784, face 576 of heat pump 570 is thermally coupled to first wall 740. Face 578 of heat pump 570 is thermally coupled to second wall 750 by internal support structure 780.

Internal support structure 780 comprises an existing internal support structure for mouse 720. In the example illustrated, support structure 780 supports and cantilevers side input buttons 435. Support structure 780 additionally comprises a tab or projection 786 which is in thermal contact with face 578 of heat pump 570. Support structure 780 is in thermal contact with second wall 750 of sidewall 425. Support structure 780 is thermally conductive. In some implementations, support structure 780 may be formed from a polymer that encapsulates thermally conductive particles. In some implementations, support structure 780 may have a material composition similar to that of heat sink 580 or second wall 550 as described above.

When temperature control system 730 is in a heating state, face 578 is cooled through its thermal connection to second wall 750 by support structure 780. Face 576, the hot face, transmits heat to first wall 740 and coating 760 to warm portions of the person's hand manipulating mouse 720. When temperature control system 730 is in a cooling state, face 578, the hot face, dissipates heat through its thermal connection to second wall 750 by support structure 780. Face 576, the cool face, absorbs heat from first wall 740 and coating 760 to cool the person's hand manipulating mouse 720.

Although the present disclosure has been described with reference to example implementations, workers skilled in the art will recognize that changes may be made in form and detail without departing from the disclosure. For example, although different example implementations may have been described as including features providing various benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:
1. An input mouse comprising:
   a top button; and
   a temperature control system comprising:
      a first wall rearward of the top button to underlie a palm of a user, the first wall being formed from a material composition comprising a first polymer encapsulating thermally conductive particles;
      a second wall forming an exterior of the input mouse, the second wall being formed from a thermally conductive material; and a solid-state Peltier heat pump having a first face thermally coupled to the first wall and a second face thermally coupled to the second wall.

2. The input mouse of claim 1 further comprising a coating over the first wall, wherein the first wall has a first concentration of the thermally conductive particles and wherein the coating has a second concentration of the thermally conductive particles, the second concentration being greater than the first concentration.

3. The input mouse of claim 2, wherein the second concentration of thermally conductive particles comprise second thermally conductive particles selected from a group of thermally conductive particles consisting of nano sized graphing, carbon nanotubes, graphite, aluminum, copper, silver, silicon carbide, aluminum nitride and boron nitride.

4. The input mouse of claim 3, wherein the second thermally conductive particles have a particle size no greater than 10 µm.

5. The input mouse of claim 2, wherein the first concentration is 0.3% or more by weight and no greater than 15% by weight and wherein the second concentration is 0.5% by weight and no greater than 30% by weight.

6. The input mouse of claim 2, wherein the first concentration of thermally conductive particles comprises a first set of thermally conductive particles and wherein the second concentration of thermally conductive particles comprises a second set of thermally conductive particles different than the first set of thermally conductive particles.

7. The input mouse of claim 6, wherein the first set comprises thermally conductive particles selected from a group of thermally conductive particles consisting of nano-sized graphene, carbon nanotubes and graphite and wherein the second set comprises thermally conductive particles selected from a group of thermally conductive particles consisting of aluminum, copper, silver, graphene, silicon carbide, aluminum nitride and boron nitride.

8. The input mouse of claim 1, wherein the second wall comprises a second polymer encapsulating second thermally conductive particles.

9. The input mouse of claim 8, wherein the second wall comprises a bottom plate of the input mouse.

10. The input mouse of claim 1, the second wall is selected from a group of mouse enclosure portions consisting of a bottom plate of the input mouse and sidewalls of the input mouse.

11. The input mouse of claim 1 further comprising an indicator to visibly indicating an operational state of the solid-state Peltier heat pump.

12. The input mouse of claim 1, wherein the thermally conductive particles comprise thermally conductive particles selected from a group of thermally conductive particles consisting of: nano-sized graphene, carbon nanotubes and graphite.

13. The input mouse of claim 1, wherein the thermally conductive particles have a particle size of no greater than 1 µm.

14. An input mouse comprising:
a top button; and
a temperature control system comprising:
a first wall rearward of the top button to underlie a palm of a user, the first wall being thermally conductive;
a second wall on an exterior of the input mouse, the second wall being thermally conductive;
a solid-state Peltier heat pump having a first face thermally coupled to the first wall and a second face thermally coupled to the second wall; and
an internal support structure thermally coupling the solid-state Peltier heat pump to one of the first wall and the second wall, the internal support structure being formed from a polymer encapsulating thermally conductive particles.

15. An input mouse comprising:
a top button; and
a temperature control system comprising:
a first wall rearward of the top button to underlie a palm of a user, the first wall being formed from a material composition comprising a first polymer encapsulating a first concentration of thermally conductive particles; and
a coating over the first wall, the coating comprising a second polymer encapsulating a second concentration of thermally conductive particles, the second concentration being greater than the first concentration; and
a second wall forming an exterior of the input mouse and thermally coupled to the first wall, the second wall being formed from a thermally conductive material.

* * * * *